L. J. JOHNSON.
MOTOR DRIVEN BICYCLE.
APPLICATION FILED APR. 27, 1916.
1,257,711.
Patented Feb. 26, 1918.
3 SHEETS—SHEET 3.
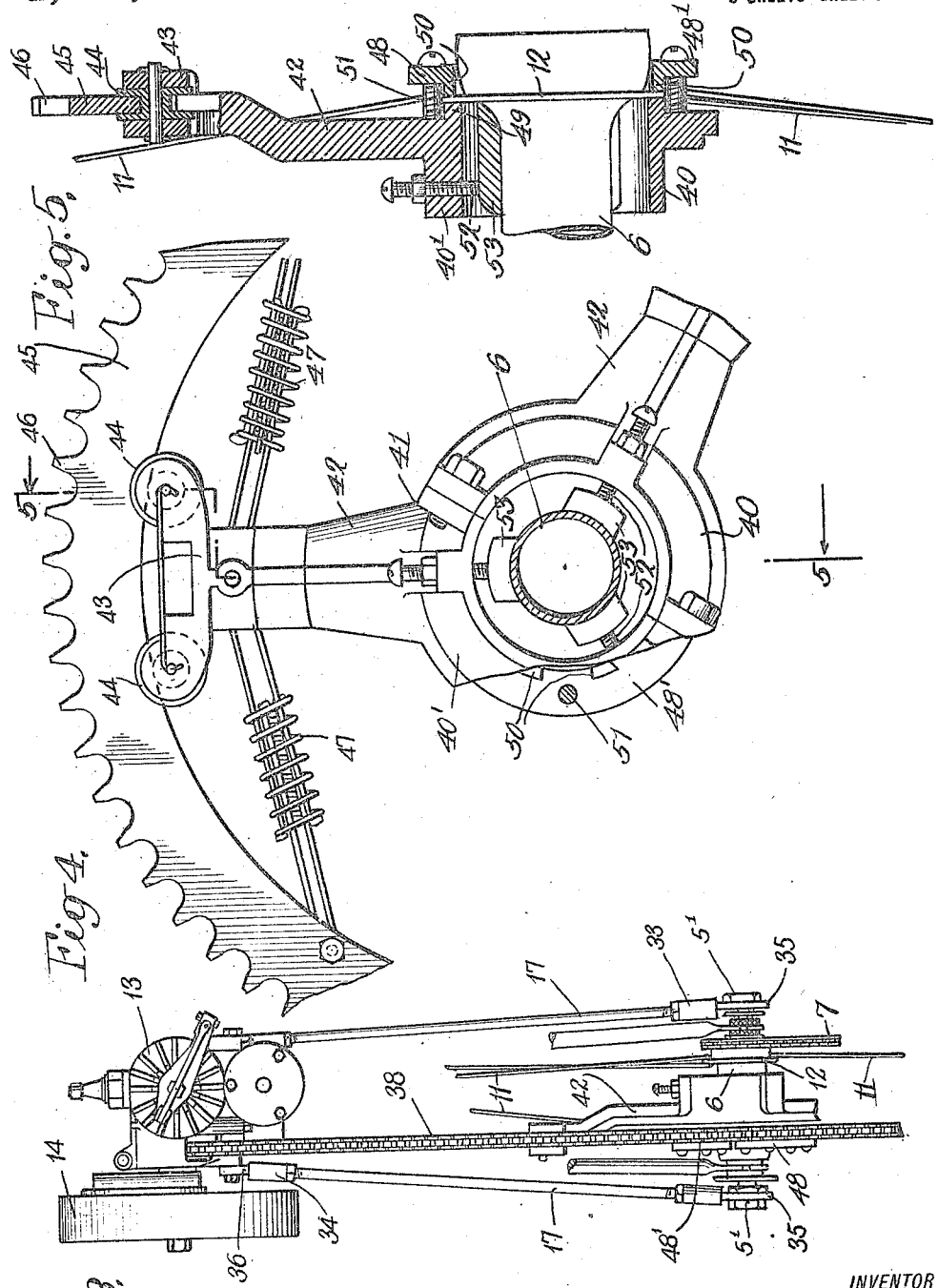
INVENTOR
L. J. Johnson
BY
J. Edwards
ATTORNEY

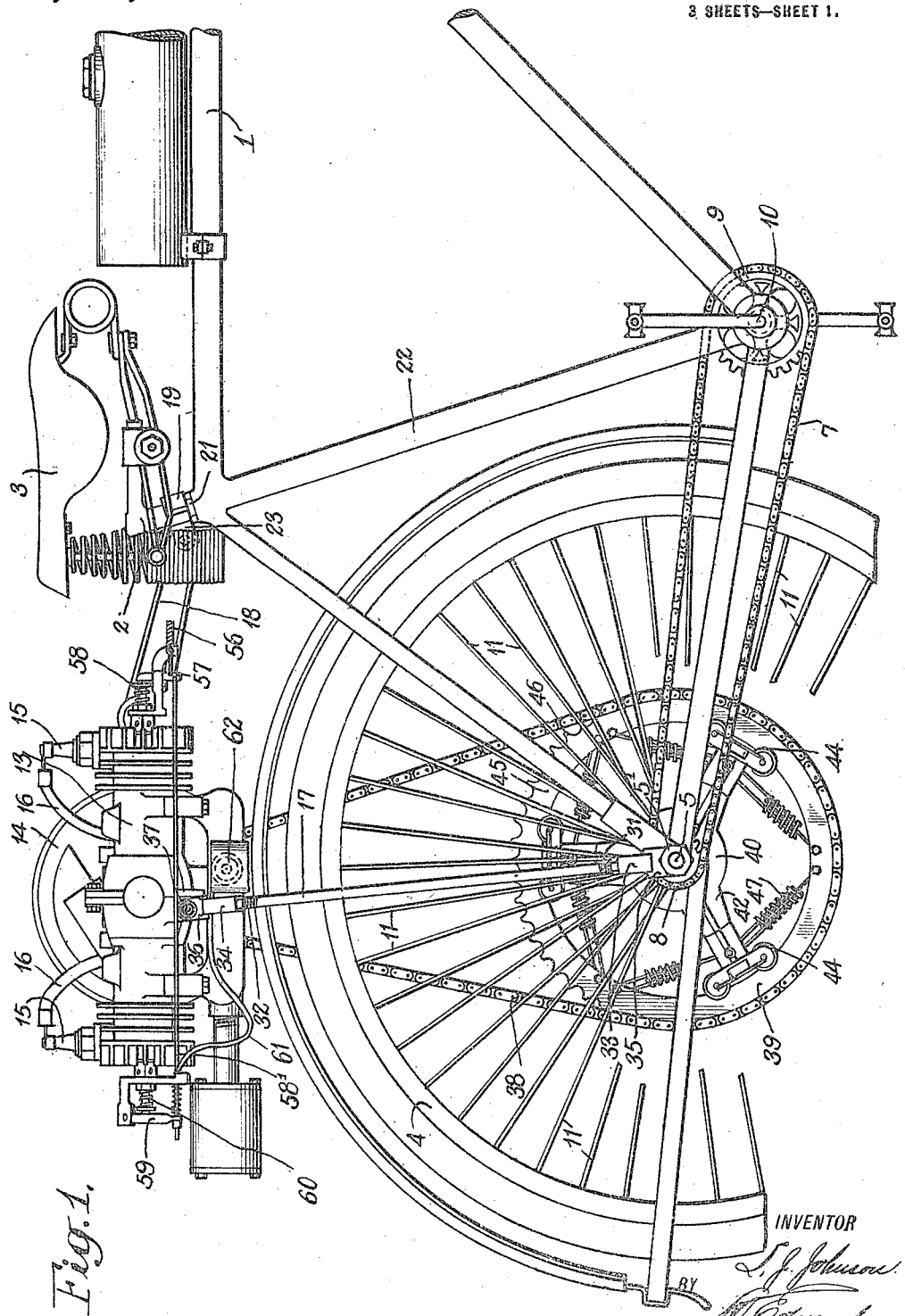

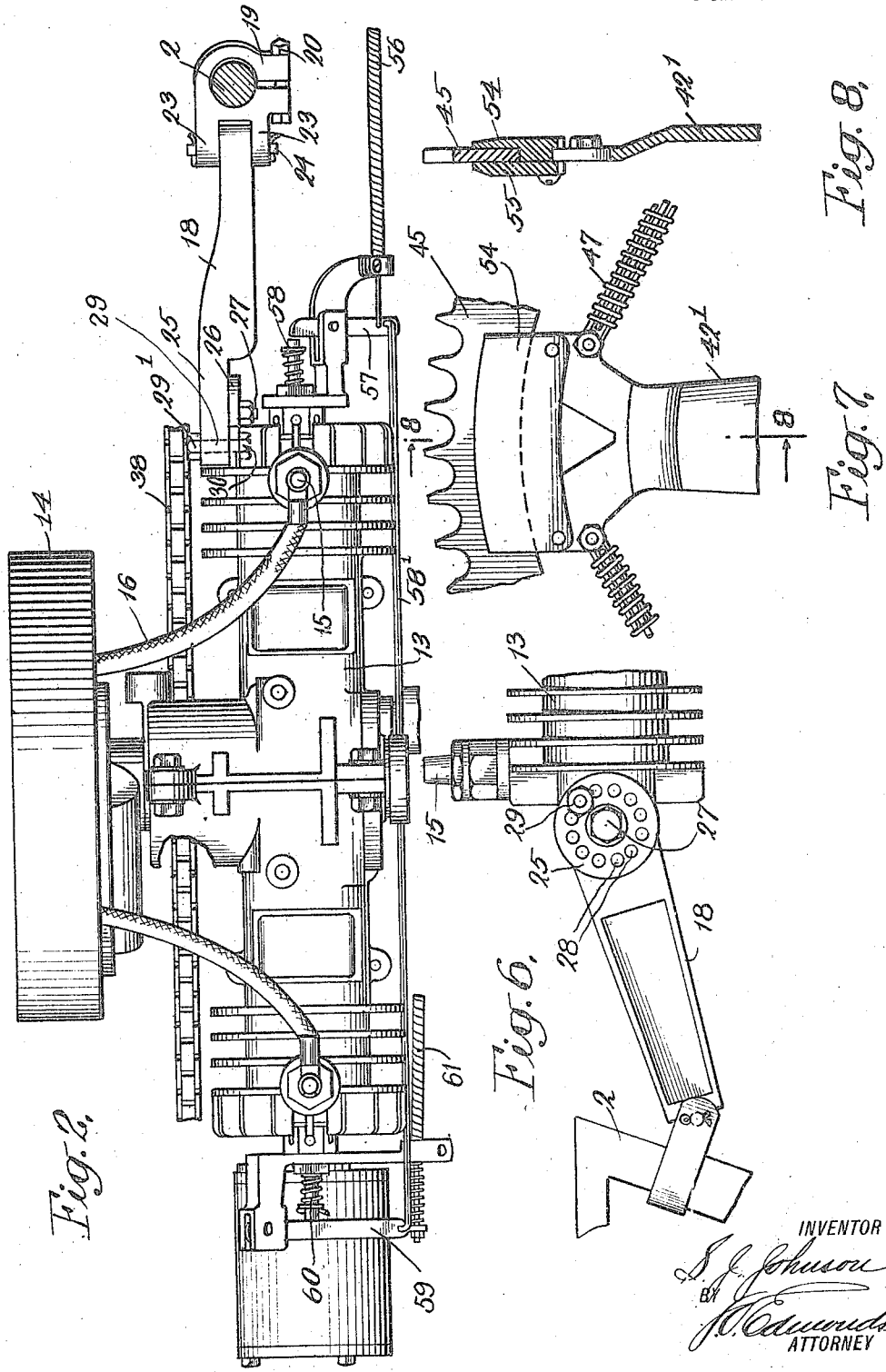

UNITED STATES PATENT OFFICE.

LOUIS J. JOHNSON, OF TERRE HAUTE, INDIANA.

MOTOR-DRIVEN BICYCLE.

1,257,711.  Specification of Letters Patent.  Patented Feb. 26, 1918.

Application filed April 27, 1916. Serial No. 93,917.

*To all whom it may concern:*

Be it known that I, LOUIS J. JOHNSON, a citizen of the United States, residing at Terre Haute, in the county of Vigo and State of Indiana, have invented certain new and useful Improvements in Motor-Driven Bicycles, of which the following is a specification.

My invention relates to motorcycles and particularly to devices whereby a suitable motor may be attached readily to an ordinary bicycle without material alteration. With this aim in view, my invention contemplates positioning a motor above the rear wheel of the bicycle and supporting the same from the rear axle by substantially vertical struts or radius rods which are arranged for convenient adjustment as to length. The forward end of the motor casing is secured to the seat-post of the bicycle by an adjustable connection including a member pivoted at its forward end to a jaw clamped to the seat-post and suitably connected at its rear end to the motor casing. Provision is made for adjusting the rear end connection of the pivoted member referred to to suit the conditions of the installation, so that the motor shall be arranged horizontally at a desired height above the rear axle. The motor may drive the rear wheel by a chain or other form of transmission from the motor to a sprocket or the like mounted on the coaster-brake hub of the rear wheel. This sprocket is so formed as to be readily secured in position with the spoke flange of the hub engaged on opposite sides by the inner and outer parts of the sprocket-wheel construction. Preferably the rim of the sprocket-wheel is not rigidly attached to the hub of the sprocket but is resiliently secured thereto by means of springs constituting a shock-absorbing mechanism.

Various advantages are gained by mounting the motor above the rear wheel, as will be more fully explained hereinafter. The objects of my invention are to provide devices of the character referred to and to provide improved details of construction and combinations of parts incidental to the construction, as will be more fully set forth hereinafter.

In order that a clearer understanding of my invention may be had, attention is hereby directed to the accompanying drawings forming part of this application and illustrating certain embodiments of my invention. In the drawings Figure 1 represents a side elevation of the rear portion of a bicycle having a motor mounted above the rear wheel thereof, Fig. 2 is a top plan view of the same, Fig. 3 is a rear elevation of the same, Fig. 4 is a partial enlarged side elevation of a form of sprocket-wheel mounted on the coaster-brake hub of the bicycle, Fig. 5 is a transverse section taken on line 5—5 of Fig. 4, Fig. 6 is an enlarged side elevation of the connection between the seat-post and the motor, viewed from the left side of the bicycle, Fig. 7 is a partial side elevation of a modified form of sprocket-wheel, and Fig. 8 is a section on line 8—8 of Fig. 7.

Referring to the drawings, the bicycle is provided with a frame 1 having a seat-post 2 on which the seat 3 may be secured in the usual manner. The rear wheel 4 of the bicycle is mounted for rotation on the rear axle 5 on which is mounted the coaster-brake hub 6. In the case of a bicycle which is adapted to be driven by a chain drive from the pedals, the chain 7 extends between the sprocket 8 on the coaster-brake hub and the sprocket-wheel 9 on the pedal shaft 10. The spokes 11 of wheel 4 are secured at their inner ends to the spoke flanges, of which one is shown at 12 in Fig. 5, on the coaster-brake hub 6.

The motor inclosed in casing 13 is preferably of the two-cycle, two-cylinder horizontal opposed type with crank pins set 180° apart. The two opposed cylinders are fired simultaneously, so that vibration is practically eliminated, making it possible to install the motor in the described position above the rear wheel of the bicycle. The fly-wheel and a high tension magneto are carried within the casing 14, the magneto contacts being connected to spark plugs 15, 15 at the opposite ends of the two cylinders by suitable conductors 16, 16.

The motor casing is supported above the rear wheel by a pair of substantially vertical radius rods 17, 17 secured at their lower ends to the rear axle. The motor casing is also secured to the seat-post 2 by means of a pivoted member 18 and adjustable connections thereto. The jaw or clamp 19 is secured about the seat-post 2 and tightened by a screw 20, this clamp resting on a nut 21 at the top of the central upright member 22 of the bicycle. Clamp 19 has rearwardly extending side portions 23, 23 through which extends the pivot pin 24 on which the forward end of the member 18 is pivotally mounted. Member 18 is preferably formed of channel or T-section and at its rear end is provided with a cylindrical portion 25 through which extends a central horizontal opening. The forward end of the motor casing is provided with a forwardly extending ear 26, the forward edge of which is circularly curved in a vertical plane. A bolt 27 is adapted to extend through ear 26 into the central opening referred to in the head 25 of member 18, member 18 being pivotally mounted at its rear end on bolt 27. The head 25 of member 18 is provided with a circular series of openings 28 extending therethrough, as is shown in Fig. 6. A bolt 29 having a head 29' is adapted to be extended through any one of the openings 28 and into a corresponding opening in ear 26, bolt 29 being provided with a nut 30 at its inner end. The connection described permits the location of the motor at a greater or less distance to the rear of the seat-post and at a greater or less height above the rear axle.

The vertical supports 17, 17 each consists of a radius rod having its lower and upper ends oppositely screw-threaded, as shown at 31, 32 in Fig. 1. Each rod 17 has a pair of terminals 33 and 34 having left and right hand threaded sockets to engage the threaded ends of rod 17. The lower terminal 33 is provided with a downwardly extending flange 35 having an opening therethrough, through which extends the outer end of the rear axle 5, on the outer side of the bicycle frame, nuts 5' being mounted on the outer ends of the axle beyond the flanges 35 of terminals 33. The upper terminals 34 are each provided with upwardly extending flanges 36 through which extend threaded studs 37 on the motor casing. By turning the terminals 33 and 34 the effective lengths of rods 17 may be varied to adjust the height of the motor above the rear axle and thereby adjust the tension of the sprocket-chain 38, or other driving connection extending between the motor and the rear wheel.

In mounting a motor in position, the pivoted member 18 may be pivotally secured on pivot pins 24 and 27 and the radius rods and their terminals positioned and adjusted to secure the desired height of the motor, whereupon the bolt 29 may be secured through whichever one of the openings 28 is in alinement with an opening in the ear 26 of the motor casing, whereupon the motor is held rigidly in position both vertically and in a fore and aft direction. The plurality of openings 28 in the end of member 18 is provided to permit securing the motor at a greater or less distance to the rear of the seat and at a greater or less height in accordance with the requirements of the particular bicycle upon which the same is mounted.

If a sprocket-chain, such as is shown at 38, is used the same passes over a sprocket 70 which is mounted direct on the motor shaft. This chain transmits power to a large sprocket 39 attached to the coaster-brake hub of the rear wheel.

The sprocket 39 is provided with a hub comprising portions 40, 40' secured together by bolts 41. The radial arms 42 are integral with the hub sections 40, 40' and are provided at their outer ends with yoke portions 43 in which are journaled rollers 44. The sprocket rim 45 provided with teeth 46 is rotatably mounted on rollers 44. Spiral springs 47 connect arms 42 of the hub sections with rim 45, two springs 47 extending in opposite directions from each arm 42. These springs permit the sprocket rim 45 to rotate a certain amount in either direction when the motor is first started before the power is fully applied through the sprocket to the rear wheel. The springs therefore act as shock-absorbing devices, to reduce the shock in either direction when power is transmitted from the internal combustion engine to the wheel.

The sprocket is also provided with an annular clamping plate formed in two halves 48, 48'. The hub sections 40, 40' are mounted on the inner side of the left hand spoke flange 12 of the coaster-brake hub 6 and the clamping ring sections 48, 48' on the outer side of the spoke flange 12. The hub sections are provided with peripheral lugs 49 which engage the adjacent side of the spoke flange 12 between the inner ends of the spokes 11, and the sections of the clamping ring 48, 48' are provided with similar projections 50 which are adapted to engage the opposite or outer side of spoke flange 12 between the inner ends of the spokes. Screws 51 extend through the clamping ring sections 48, 48' into the hub sections 40, 40' when the sprocket is assembled to clamp the hub in position against the inner surface of the spoke flange 12 of the coaster-brake hub.

The hub is also provided with three or more screws 52 which extend radially through bosses on the hub members and engage the coaster-brake hub 6. Clamping blocks 53 may be provided at the inner ends of set screws 52 to directly engage hub 6. Screws 52 serve to centralize the sprocket hub and to prevent lateral strains which might bend or spring the spoke flange 12. The sprocket hub is not only clamped to the spoke flange by the clamping ring and screws 51 but also it is prevented from revolving by the projections 49 and 50 of the sprocket hub and clamping ring coming into contact with the spokes. The sprocket hub as stated is made in two parts in order to make installation of the same possible without dismantling the bicycle wheel. The clamping plate 48, 48' is preferably divided in sections, as shown, in order to permit the use of the same with various makes of bicycle and coaster-brake, including coaster-brakes which have enlarged ends outside the spoke flange.

A modified form of rear wheel sprocket is partially illustrated in Figs. 7 and 8. In this form the rim 45 is slidably mounted in guides on the arms of the hub instead of being mounted on the rollers 44. As illustrated, each arm 42' is formed at its outer end with an offset portion 54, a slideway or guide for the rim 45 being formed between portion 54 and a curved plate 55 which may be screwed or otherwise secured to the arm 42' as shown.

My invention is not limited as to the type of motor to be used. The form illustrated is well adapted for the purpose, comprising as stated a horizontal opposed two-cylinder, two-cycle engine in which the impulses in the two cylinders are simultaneous. A control wire in a flexible casing 56 extends to the control lever which is attached to the handle-bar of the bicycle (not shown), the wire inclosed in casing 56 being connected to the lever 57 which is adapted to operate the pressure relief valve 58 of the front cylinder. Lever 57 is connected by link 58' to lever 59 which similarly controls the pressure relief valve 60 of the rear cylinder. Lever 59 is also connected by a wire inclosed in flexible casing 61 to the throttle of carbureter 62, so that the one control lever on the handle-bar serves to throttle the carbureter and open and close the two pressure relief valves.

In case belt transmission should be used between the motor and the rear wheel in place of the chain drive described, it is advisable to install a counter-shaft in the motor to turn at a less speed than the crankshaft of the motor upon which, as stated, the upper sprocket is mounted in the form of my device illustrated. In this case also a pulley rim obviously takes the place of the sprocket rim 45.

As to the advantages of the construction described, it may briefly be noted that installation of the motor above the rear wheel causes the weight of the same to be borne by the rear wheel and rear portion of the frame, and thus reduces the possibility of breaking the less substantial front portion of the construction. It should be noted that motors installed inside the frame as is the common practice add fully as much weight to the front wheel as to the rear wheel. The installation described provides ample space for the use of a substantial motor, whereas when the power plant is installed inside the frame the width of the motor is limited by the frame parts and the revolving cranks. With the construction described, the motor can be readily installed on any type of bicycle, whereas many previously built bicycles do not have sufficient space inside the frame for a motor. Also with the construction described there is sufficient space between the frame and the tire of the rear wheel to permit the use of an adequate chain or belt from the rear wheel sprocket to the motor, whereas there is a less opening for the use of a chain or belt when the motor is situated inside the frame. With my construction also the motor is attached to the most substantial parts of the bicycle, namely the seat-post and the rear axle, thus avoiding the transmission of such vibrations and other strains to the tubing as would tend to crystallize the same. The rear sprocket described is adapted to readily be installed on various forms of bicycle without alteration of the latter, makes possible a substantial application of power to the bicycle wheel, and is so constructed as to prevent strains on the bicycle by shocks from the motor. It also prevents the motor impulses from tending to slip the tire on the rim on the rear wheel or on the ground, and acts as a cushion device to absorb the excess force of the motor at the times of motor impulse.

It should be understood that my invention is not limited strictly to the exact details of construction described, but that the same is as broad as is indicated by the accompanying claims.

Having now described my invention, what I claim and desire to protect by Letters Patent is as follows:—

1. In a device of the character described, the combination with a bicycle having a seat-post, rear axle and wheel thereon, said axle extending beyond the bicycle frame on both sides, of a motor having a casing, detachably mounted above the said wheel, supporting rods the effective length of which is adjustable detachably secured at their upper ends to said casing and at their lower ends to the end portions of said axle, adjustable connections between said motor casing and a point on the seat-post, arranged to rigidly connect said casing to the seat-post, so that the casing is supported at a variable distance to the rear of the seat-post and at a greater or less height above the rear axle, and connections for driving the bicycle from said motor, substantially as set forth.

2. In a device of the character described, the combination with a bicycle having a seat-post, rear axle and wheel thereon, of a motor having a casing, driving connections between the motor and the rear wheel, and means for supporting the motor casing in adjusted position above the rear wheel, said means comprising supports pivoted on said axle, with means for fixedly securing the same thereon, and a bar pivoted to said seat-post, and adapted to be secured to the motor casing in adjusted position at different angles in a vertical plane, substantially as set forth.

3. In a device of the character described, the combination with a bicycle having a seat-post, rear axle and wheel thereon, of a motor having a casing, driving connections between the motor and the rear wheel, and means for supporting the motor casing in adjusted position above the rear wheel, said means comprising supports extending upwardly from the rear axle, and connections from the casing to the seat-post, comprising a jaw clamped to the seat-post, a member pivoted to the jaw to swing thereabout in a vertical plane, a pivotal connection between said member and casing, and means for securing said member fixedly to said casing in adjusted positions of said member and casing, substantially as set forth.

4. In a device of the character described, the combination of a motor casing, a bicycle having a frame, means supporting said casing from the rear axle of the bicycle, said casing having a forwardly directed flange having horizontal openings therethrough, a bar pivoted to the seat-post of the bicycle, having a central horizontal opening at its rear end and other horizontal openings about the said opening, a pivot pin extended through said central opening and one of the openings in said flange, and a bolt adapted to extend through any of the other openings of said bar and an alined opening in said flange, substantially as set forth.

This specification signed and witnessed this 24 day of April, 1916.

LOUIS J. JOHNSON.

Witnesses:
SAMUEL D. ROYBE,
DELLA M. BAYLESS.

Copies of this patent may be obtained for five cents each, by addressing the "Commissioner of Patents, Washington, D. C."